Figure 1:
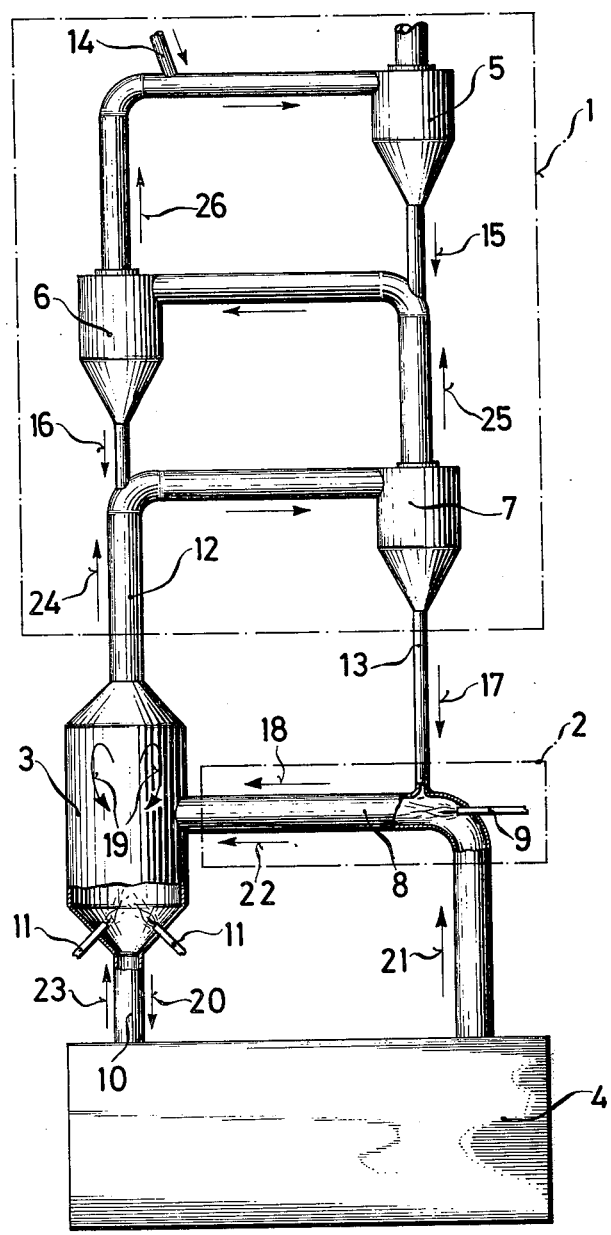

United States Patent [19]

Weber et al.

[11] 4,118,177

[45] Oct. 3, 1978

[54] APPARATUS AND METHOD FOR CALCINING OR SINTERING FINE-GRAINED MATERIAL

[75] Inventors: Paul Weber, Oelde; Erich Lankes, Ennigerloh; Gerhard Butschko, Hamm; Horst Ritzmann, Enniger; Peter Wolfgang Bohm, Oelde-Stromberg, all of Fed. Rep. of Germany

[73] Assignee: Polysius AG, Neubeckum, Fed. Rep. of Germany

[21] Appl. No.: 739,543

[22] Filed: Nov. 8, 1976

[30] Foreign Application Priority Data

Nov. 10, 1975 [DE] Fed. Rep. of Germany ....... 2550469
Nov. 10, 1975 [DE] Fed. Rep. of Germany ....... 2550384
Nov. 10, 1975 [DE] Fed. Rep. of Germany ....... 2550418

[51] Int. Cl.² .............................. F27B 15/00
[52] U.S. Cl. ...................... 432/14; 432/58; 432/106
[58] Field of Search .............. 432/14, 15, 58, 106

[56] References Cited

U.S. PATENT DOCUMENTS

| 3,932,117 | 1/1976 | Ritzmann | 432/14 |
| 4,025,295 | 5/1977 | Touborg | 432/14 |
| 4,039,277 | 8/1977 | Kobayashi et al. | 432/106 |

Primary Examiner—John J. Camby
Attorney, Agent, or Firm—Learman & McCulloch

[57] ABSTRACT

Fine-grained material is heat treated by being preheated and then is heated to its calcining or sintering temperature, following which it is again heated to such temperature and subsequently cooled. The concentration and residence time of the material during its second heating are greater than they are during its first heating, and the concentration of oxygen is greater during the first heating of the material than during its second heating.

13 Claims, 2 Drawing Figures

APPARATUS AND METHOD FOR CALCINING OR SINTERING FINE-GRAINED MATERIAL

This invention relates to an installation for calcining or sintering fine-gained material, such as alumina, lime, dolomite, magnesite or the like, comprising a preheating zone heated by the hot waste gases from a calcining zone, a calcining zone in which the material is further heated by means of a hot gas stream produced by a flame, a separation zone for separating the material from the hot gas stream and a cooling zone for cooling the separated material.

An installation of the kind described above is known, for example from German specification No. 2,350,768. In this installation, the calcining zone is formed by a gas pipe which is heated by a burner and which is directly connected to a separation cyclone. The highly preheated material travels through the calcining zone relatively quickly, passing the flame of the burner, and is then immediately separated in the cyclone.

An installation such as this gives a satisfactory product in the case of raw materials which should best be kept only briefly at elevated temperature (final treatment temperature of the calcining or sintering process). However, there are also materials in whose case a somewhat longer high-temperature treatment is desirable. Since in addition the optimum heat treatment (in regard to the individual temperature values, the duration of the heat treatment, the temperature gradient as a function of time, etc.) differs considerably from one material to another, adaptability of the installation to the particular requirements of the material is desirable.

Accordingly, the object of the present invention is to provide an installation of the kind referred to in such a way that, on the one hand, materials requiring a longer heat treatment time may also be optimally calcined or sintered whilst, on the other hand, the installation may readily be adapted to meet different material requirements.

According to the invention, this object is achieved by virtue of the fact that the separation zone is heated and forms a second calcining zone.

The invention makes use of the knowledge that the separation process, i.e., separation of the heated material from the hot gas stream in the separation zone, takes a certain time which may be used with advantage for extending the calcining process. Arranging two separately heated calcining zones one behind the other affords the further advantage that the calcining conditions in the two calcining zones are different and, hence, may be optimally adjusted to suit the particular material being treated. In this way, the time-related temperature gradient, to which the material is exposed during its passage through the two calcining zones, may be optimally adapted within wide limits to suit the particular material being treated.

Arranging two calcining zones, through which the particles of material pass in immediate succession, one behind the other also ensures that each particle of material reliably undergoes the required heat treatment (within narrow limits) because, in view of the high speed at which the particles of material pass through the first flame-heated calcining zone and also in view of certain irregularities in the input of material into the first calcining zone, which it is not possible to avoid in practice, and finally in view of the temperature distribution in this first calcining zone, it is not possible with absolute certainty to rule out the possibility that, after passing through the first calcining zone, individual particles of material have undergone a somewhat less intense heat treatment than other particles of material. However, the fact that the entire quantity of material then passes through the second calcining zone ensures, with high statistical probability, that after passing through this second calcining zone all the particles of material are ultimately calcined or sintered to substantially the same degree.

In the case described above, the object of the heat treatment is above all to ensure that a particularly homogeneous end product is obtained for a relatively short residence time of the material in the calcining zone. However, there are also cases where homogeneity of the end product is less important than as long as possible a residence time of the material in the high temperature zone. According to the invention, an installation which satisfies both requirements, depending upon the particular raw material used and upon the required heat treatment, is distinguished by the fact that the material discharge pipe of the first (lowermost) cyclone of the preheating zone is connected by way of a distributor to the first calcining zone and to the cooling zone, and by the fact that a second cyclone of the preheating zone connected to the gas outlet pipe of the first cyclone is designed to be connected through its material discharge pipe either to the gas pipe leading from the reaction zone to the first cyclone, or to the first calcining zone.

In an installation of this kind, the supply of material may optionally be adjusted in such a way that either the entire material is separated off after a single passage through the two calcining zones and is delivered to a cooling zone or only part of the material separated from the gas stream is delivered to the cooling zone, whereas the rest of the material is returned to the calcining zones.

The shape and dimensions of the two calcining zones are best selected in such a way and the rate of gas flow in the two calcining zones is best adjusted in such a way that the concentration of material is higher and the residence time of the material longer in the second calcining zone than in the first calcining zone.

In addition, the output of material from the reaction zone forming the separation zone and the second calcining zone may with advantage be constricted in such a way that a much higher concentration of material with a longer residence time is obtained in the lower region of the reaction zone than in the remainder of the reaction zone. This lower region of the reaction zone with its greatly increased concentration of material thus represents as it were a carbonizing zone in which the chemical and physical state of all the particles of material is rendered completely uniform and certain longer lasting reactions, if any, can take place.

Figure 2:
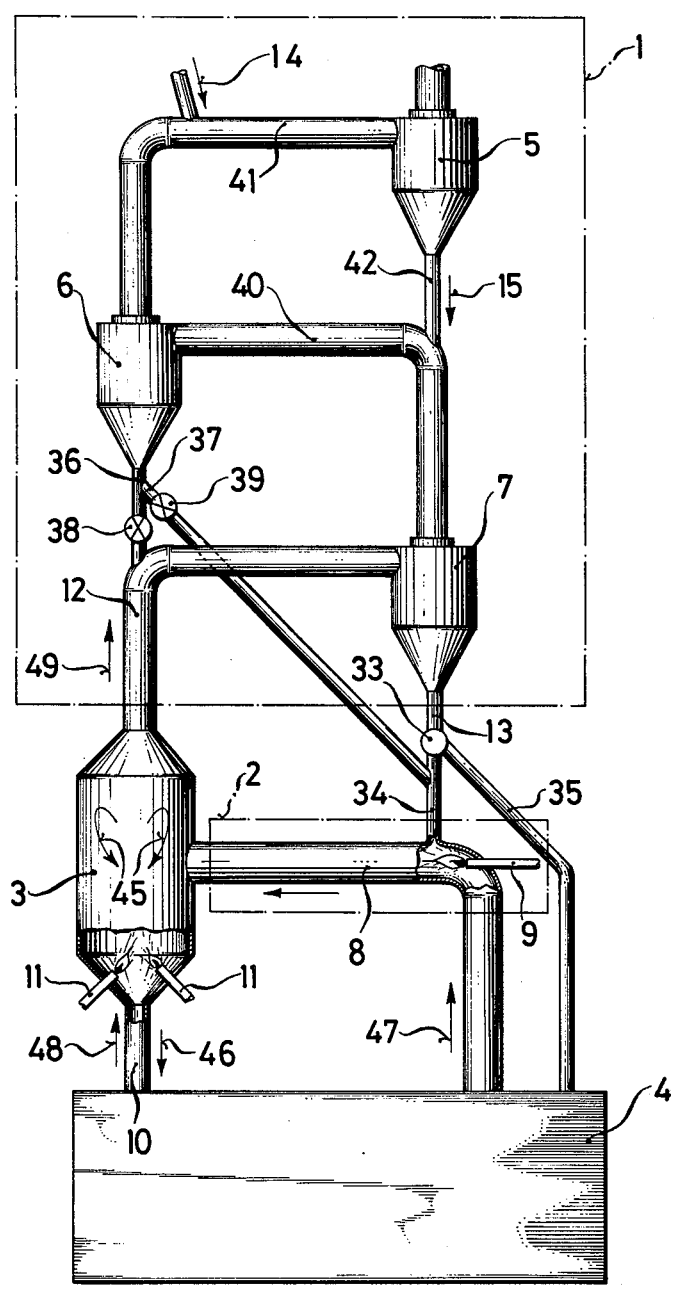

Two embodiments of the installation according to the invention are diagrammatically illustrated by way of example in the accompanying drawing, wherein:

FIG. 1 is a diagrammatic elevational view, partly broken away, of one embodiment; and FIG. 2 is a similar view of a second embodiment.

The installation illustrated in FIG. 1, which is used for example for calcining alumina, contains a preheating zone 1, a first calcining zone 2, a reaction zone 3 acting both as a second calcining zone and as a separation zone, and a cooling zone 4 to which air is delivered in known manner. In the embodiment illustrated, the preheating zone 1 includes three cyclones 5, 6 and 7. However, it is emphasized that other kinds of preheaters for fine-grained material may also be used for the purposes of the invention.

The first calcining zone 2 is formed by a gas pipe 8 which is fed with hot exhaust air from the cooling zone 4 and which is provided with a burner 9. The gas pipe 8 opens laterally, preferably substantially horizontally, into the reaction zone 3 which forms the separation zone and the second calcining zone.

The substantially vertically arranged reaction zone 3 is connected at its lower end to a gas pipe 10 which is fed with exhaust air from the cooling zone 4 and which may also be used for discharging the material. However, it is also possible for the material to be discharged from the reaction zone 3 through a separate pipe leading to the cooling zone 4. The drawing does not show valves, gates or the like optionally provided in the gas pipe 10 to ensure in known manner that the exhaust air from the cooling zone only flows upwards through the gas pipe 10, whilst the material discharged from the reaction zone 3 travels downwards through the pipe 10.

In addition, the reaction zone 3 is equipped with burners 11 in its lower region. The upper region of the reaction zone 3 is connected through a gas pipe 12 to the lowermost cyclone 7 of the preheating zone 1.

The material discharge pipe 13 of the cyclone 7 opens into the gas pipe 8 forming the first calcining zone 2. In addition, the cyclones 5, 6 and 7 of the preheating zone 1 are connected through their gas and material pipes in the manner illustrated in the drawing.

The cross section of the reaction zone 3, which forms the second calcining zone and also the separation zone, is considerably larger than the cross section of the gas pipe 8 which forms the first calcining zone 2.

The installation illustrated in the drawing operates as follows:

The material introduced at 14 passes first into the cyclone 5, after separation (arrow 15) in this cyclone 5 into the cyclone 6, after separation (arrow 16) into the cyclone 7 and, having thus been highly preheated in several stages, is introduced by way of the material discharge pipe 13 (arrow 17) into the calcining zone 2. In the calcining zone 2, the material passes the flame produced by the burner 9, travels through the gas pipe 8 (arrow 18) and enters the reaction zone 3 where the material makes a turbulent whirling movement (diagrammatically indicated by the arrows 19) for a certain time and, at the same time, is further heated by the burner 11 and, finally, is deposited onto the side walls and at the bottom of the reaction zone 3. Finally, the material enters the cooling zone 4 through the pipe 10 (arrow 20).

Exhaust air from the cooling zone 4 is delivered to the first calcining zone 2 (arrow 21). The hot gases from this first calcining zone 2 (arrow 22) flow with the material (arrow 18) into the reaction zone 3 into which some more exhaust air from the cooling zone (arrow 23) is introduced from below by way of the gas pipe 10. After separation from the material, the exhaust gases (arrow 24) leave the reaction zone 3 by way of the pipe 12 and then pass through the cyclones 7, 6 and 5 of the preheating zone 1 in the direction indicated by the arrows 25, 26.

When the installation is in operation, the output of material (arrow 20) from the reaction zone 3 forming the separation zone and the second calcining zone is best constricted to such an extent that the concentration and residence time of the material in the lower region of the reaction zone 3 are greatly increased in relation to the remainder of the reaction zone. In this way, the lower region of the reaction zone 3 forms a carbonizing zone which ensures that all the particles of material are calcined or sintered to substantially the same degree.

Most of the fine-grained material is separated from the gas stream in the reaction zone 3 and is discharged downward toward the cooling zone 4. Only a very small quantity of the material, more especially a certain quantity of the extremely fine fraction, is discharged upwards with the gas stream (arrow 24) and subsequently separated in the cyclone 7. However, by far the largest quantity of the material passes only once through the two calcining zones (first calcining zone 2 and reaction zone 3 as the second calcining zone).

The second embodiment of an installation according to the invention illustrated by way of example in FIG. 2 also includes a preheating zone 1, a first calcining zone 2, a reaction zone 3 acting both as the second calcining zone and, optionally, as separation zone, and a cooling zone 4. In this embodiment, too, the preheating zone 1 is provided with three cyclones 5, 6 and 7.

The first calcining zone 2 is formed by a gas pipe 8 which is fed with exhaust air from the cooling zone 4 and which is provided with a burner 9. The reaction zone 3 is connected at its lower end to a gas pipe 10 fed with exhaust air from the cooling zone 4. In addition, the reaction zone 3 is provided with burners 11 in its lower region. The upper region of the reaction zone 3 is connected by way of a gas pipe 12 to the lowermost cyclone 7 of the preheating zone 1.

The material discharge pipe 13 of the cyclone 7 leads to a distributor 33 from which a pipe 34 leads to the gas pipe 8, i.e., to the calcining zone 2, whilst a second pipe 35 is connected to the cooling zone 4.

The cyclone 6 may optionally be connected to the pipe 12 by way of a material discharge pipe 36 or to the pipe 34 by way of a material discharge pipe 37. Shutoff members 38, 39 are provided in the material discharge pipes 36, 37.

For the rest, the cyclones 5, 6 and 7 are interconnected through their gas pipes 40, 41 and the material discharge pipe 42 of the cyclone 5.

The installation shown in FIG. 2 may be operated by two different methods.

In the first mode of operation, the shutoff member 38 is opened and the shutoff member 39 closed so that the material separated in the cyclone 6 enters the pipe 12. The distributor 33 is adjusted in such a way that the entire quantity of material separated in the cyclone 7 is delivered to the gas pipe 8 by way of the pipe 34.

In this mode of operation, the material introduced at 14 first passes in known manner through the gas pipe 41, is separated in the cyclone 5, subsequently enters the cyclone 6 by way of the material discharge pipe 42 and the gas pipe 40, is separated in the cyclone 6 and introduced into the gas pipe 12 by way of the material discharge pipe 36. After separation in the cyclone 7, the material passes through the pipe 34 into the gas pipe 8 which is heated by the burner 9 and which forms the first calcining zone.

The fine-grained material highly preheated in the cyclones 5, 6 and 7 by contact with the hot exhaust gases from the reaction zone 3 is further heated in the calcining zone 2 on passing the flame produced by the burner 9 and then enters the reaction zone 3 which forms a second calcining zone and at the same time a separation zone. In this chamber 3, the material makes a turbulent whirling movement (diagrammatically indicated by arrows 45), is then separated and leaves the reaction zone 3 through the pipe 10 (arrows 46) which delivers the material highly heated in the two calcining zones to the cooling zone 4.

Waste hot air from the cooling zone 4 (arrow 47) is delivered to the calcining zone 2. The hot gases then enter the reaction zone 3 from the gas pipe 8. More exhaust air from the cooling zone 4 (arrow 48) is delivered to the reaction zone 3 by way of the pipe 10. After separation of the material, the hot gases leave the reaction zone 3 through the pipe 12 (arrow 49) and then pass through the cyclones 7, 6 and 5, preheating the fine-grained material as they do so.

In the mode of operation described above, therefore, the entire quantity of material is separated after a single passage through the two calcining zones (first calcining zone 2 and reaction zone 3) and delivered to the cooling zone 4, just as in the embodiment illustrated by way of example in FIG. 1. In view of the uniform treatment time of all the particles of material, the end product in this mode of operation has a particularly high degree of homogeneity.

By contrast, in the second mode of operation described in the following, the shutoff member 38 is closed and the shutoff member 39 opened, so that the material separated in the cyclone 6 is delivered to the calcining zone 2 by way of the pipe 37. The distributor 33 is adjusted in such a way that part of the material separated in the cyclone 7 is delivered by way of the pipe 35 to the cooling zone 4, whilst the rest of the material enters the calcining zone 2 by way of the pipe 34.

The material, again introduced at 14, is first preheated in the cyclones 5 and 6 and then passes through the pipe 37 into the calcining zone 2. On passing the flame of the burner 9, the material is further heated in the gas pipe 8. The material undergoes further heat treatment in the reaction zone 3 which forms a second calcining zone. However, in contrast to the mode of operation described earlier, the material is not separated from the gas stream and discharged downwards in the reaction zone 3; instead it leaves the reaction zone 3 together with the hot exhaust gases through the pipe 12. After separation of the material 33 is the cyclone 7, part of the material is delivered by the distributor 33 to the cooling zone 4 by way of the pipe 35, whilst the rest of the material is returned to the first calcining zone 2 through the pipe 34. Accordingly, a circulation-residence stage is provided for the material in this mode of operation. Depending upon the setting of the distributor 33, the material makes a more or less long circuit in that part of the installation formed by the first calcining zone 2, the reaction zone 3 and the cyclone 7.

Since, in statistical terms, the material delivered to the cooling zone 4 through the pipe 35 contains particles of material with different resident times in the calcining zone, the end product in this mode of operation does not have the same homogeneity as in the previously described mode of operation. However, this second mode of operation has the advantage, desirable for numerous products, of a much longer residence time of the material in the calcining zone in terms of a statistical average.

We claim:

1. In an installation for heat treating fine-grained material such as alumina, lime, dolomite, magnesite and the like having means for preheating said material and discharging preheated material downstream, means downstream from and communicating with said preheating means and forming a calcining chamber, means for delivering gases to said calcining chamber, first heating means communicating with said calcining chamber for raising the temperature of said gases and heating the preheated material to a higher temperature, means downstream from and communicating with said calcining chamber for separating said material from said gases, and cooling means downstream from and communicating with the separating means for receiving said material, the improvement comprising second heating means interposed between said calcining chamber and said cooling means for heating said material to a still higher temperature prior to the separation of said material and said gases.

2. The installation set forth in claim 1 wherein the means or delivering gases to said first calcining chamber includes a duct extending from said cooling means to said first calcining chamber.

3. The installation set forth in claim 1 wherein said first heating means comprises burner means in said first calcining chamber for supplying heat to the latter.

4. The installation set forth in claim 1 wherein said second heating means comprises burner means in said separating means.

5. The installation set forth in claim 1 wherein said separating means has a cross sectional area larger than that of said first calcining chamber.

6. The installation set forth in claim 1 wherein said separating means comprises a substantially vertically oriented second chamber with which said first calcining chamber communicates laterally.

7. The installation set forth in claim 1 wherein said second chamber has a material outlet opening at its lower end and a gas discharge outlet at its upper end in communication with said preheating means.

8. The installation set forth in claim 1 wherein said preheating means comprises a plurality of interconnected cyclones, the first one of which communicates with said first calcining chamber and with said cooling means, and means for selectively discharging preheated material to said first calcining chamber from the final cyclone or from an intermediate cyclone, and means for discharging preheated material from the final cyclone selectively to said first calcining chamber or said cooling means.

9. The installation set forth in claim 1 wherein said separating means has a discharge opening of such size relative to that to said calcining chamber that material introduced to said separating means is exposed to said second heating means for a period of time greater than the time said material occupies said calcining chamber.

10. In a method of heat treating fine-grained materials such as alumina, lime, dolomite, magnesite, and the like, wherein said material is preheated, then subjected to hot gases heated to such temperature as to raise the temperature of the preheated material to a calcining or sintering temperature, and then separated from the hot gases and subsequently cooled, the improvement comprising heating said material for a second time to a calcining or sintering temperature prior to its separation from said hot gases, thereby subjecting said material to two consecutive heating stages.

11. The method set forth in claim 10 including maintaining the second heating of said material for a period of time longer than the first heating.

12. The method set forth in claim 11 including concentrating said material during its second heating to an extent greater than during its first heating.

13. The method set forth in claim 10 including providing a higher concentraion of oxygen during the first heating of said material than during its second heating.

* * * * *

UNITED STATES PATENT AND TRADEMARK OFFICE
CERTIFICATE OF CORRECTION

PATENT NO. : 4,118,177
DATED : October 3, 1978
INVENTOR(S) : Paul Weber et al

It is certified that error appears in the above-identified patent and that said Letters Patent are hereby corrected as shown below:

Column 5, line 3 change "arrows" to -- arrow --.

Column 6, line 10 after "still" insert -- further --.

Column 6, line 14 change "or" to -- for --.

Column 6, line 29 change "1" to -- 6 --.

Column 6, line 45 change "to" (second occurrence) to -- of --.

Column 6, line 66 change "concentraion" to --concentration --.

Signed and Sealed this

Twenty-sixth Day of December 1978

[SEAL]

Attest:

RUTH C. MASON
Attesting Officer

DONALD W. BANNER
Commissioner of Patents and Trademarks